United States Patent
Kim et al.

(12) 
(10) Patent No.: US 9,886,875 B2
(45) Date of Patent: Feb. 6, 2018

(54) INTRUSION SIMULATOR

(71) Applicant: Koreatesting Co., Ltd., Daejeon (KR)

(72) Inventors: Hyoung Eui Kim, Daejeon (KR); Hyoung Joon Kim, Daejeon (KR); Hyoung Min Kim, Daejeon (KR)

(73) Assignee: Koreatesting Co., Ltd., Daejeon (KR)

( * ) Notice: Subject to any disclaimer, the term of this patent is extended or adjusted under 35 U.S.C. 154(b) by 243 days.

(21) Appl. No.: 14/719,074

(22) Filed: May 21, 2015

(65) Prior Publication Data

US 2016/0042669 A1 Feb. 11, 2016

(30) Foreign Application Priority Data

Aug. 8, 2014 (KR) .................. 10-2014-0102517

(51) Int. Cl.
*G09B 25/02* (2006.01)

(52) U.S. Cl.
CPC .................................. *G09B 25/02* (2013.01)

(58) Field of Classification Search
CPC ................................ G09B 25/02; G01N 17/00
USPC ......... 73/12.01, 886.4, 865.6, 121; 280/784; 180/274; 296/187.03
See application file for complete search history.

(56) References Cited

U.S. PATENT DOCUMENTS

| 7,415,903 B2 * | 8/2008 | Crossman | G01M 17/0078 |
| | | | 73/865.6 |
| 7,789,185 B2 * | 9/2010 | Eriksson | B60N 3/066 |
| | | | 180/274 |

FOREIGN PATENT DOCUMENTS

| JP | 200262230 A | | 2/2002 |
| JP | 2002062230 A | * | 2/2002 |
| KR | 20120052845 A | * | 5/2012 |
| KR | 1020120052845 A | | 5/2012 |

OTHER PUBLICATIONS

Translation of Nagasawa et al. (KR 20120052845 A).*

* cited by examiner

*Primary Examiner* — Lisa Caputo
*Assistant Examiner* — Nathaniel T Woodward
(74) *Attorney, Agent, or Firm* — The Webb Law Firm (57) ABSTRACT

Provided is an intrusion simulator, and more particularly, an intrusion simulator capable of reproducing a situation in which a passenger's ankle is broken at the time of intrusion of a structure such as a steering gear box due to a head-on collision of a vehicle and a collision situation of passenger's knees with a wheel or a dash board due to the intruded structure, and applying the accelerating force using the automatically controllable servo actuator to reproduce each situation to perform the simulation so as to obtain the accurately measured values, and to improve a structure of the vehicle body in the development or production of the vehicle.

8 Claims, 10 Drawing Sheets

FIG. 1

PRIOR ART

INTRUSION SIMULATOR

CROSS-REFERENCE TO RELATED APPLICATION

This application claims priority under 35 U.S.C. §119 to Korean Patent Application No. 10-2014-0102517, filed on Aug. 8, 2014, in the Korean Intellectual Property Office, the disclosure of which is incorporated herein by reference in its entirety.

TECHNICAL FIELD

The following disclosure relates to an intrusion simulator, and more particularly, to an intrusion simulator capable of reproducing a situation in which a passenger's ankle is broken at the time of intrusion of a structure such as a steering gear box due to a head-on collision of a vehicle and a collision situation of passenger's knees with a wheel or a dash board due to the intruded structure.

BACKGROUND

To test safety of a vehicle, automobile companies and research institutes perform a safety test. In particular, researches for minimizing bad effects on passengers by simulating situations occurring due to a collision accident of a vehicle in advance have been conducted.

As a plan of the research, a collision test process for testing how passengers are affected at the time of the occurrence of a safety accident is essentially performed when car makers develop new cars.

In the collision test process, a dummy is placed inside a vehicle which is an object of a collision test and then collides with a collision member, and the like at various speeds, and as a result an impact applied to the dummy is measured by a meter such as a sensor or is photographed as an image to be analyzed.

However, the collision test process is accompanied by a long preparation process due to the preparation of a plurality of actual vehicles meeting speed conditions for testing, the preparation of dummies meeting conditions in vehicles, and the like and therefore is quite expensive to use vehicles for the tests, in addition to a long investment period. As a result, the collision test process may cause temporal and human losses.

To solve the above problem, a collision test of a vehicle is performed by installing an accelerated actuator for test in the vehicle and applying an accelerating force generated by a pressure fluid to a tested vehicle through a piston and a rod within the actuator or applying the accelerating force to a simulator.

The intrusion simulator is performed under the reproduction environment similar to the actually tested vehicle, which has advantages of saving costs than the case of using the actually tested vehicle and the preparation time for simulation.

An intrusion simulator (Vehicle collision simulation testing device) is disclosed in Japanese Patent Laid-Open Publication No. 2002-062230 ("Load Testing Method, Feb. 28, 2002), U.S. Pat. No. 7,415,903 ("Method and System for an Impact Sled Footwell Intrusion System", Aug. 26, 2008), and Korean Patent Laid-Open Publication No. 10-2012-0052845 ("Vehicle Collision Simulation Testing Device").

Figure 2:
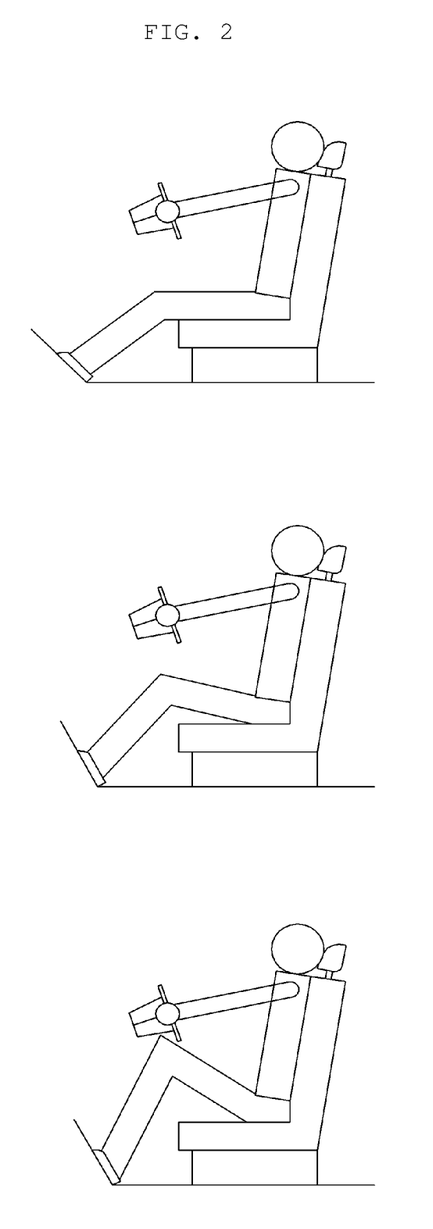
FIG. 2 is a diagram conceptually illustrating an effect on a driver at the time of a collision of a vehicle.

However, the cited documents may reproduce the situation in which passengers' ankles are broken due to the steering gear box, etc., at the time of the collision of the vehicle but as illustrated in FIG. 2, may not reproduce the collision situation of passengers' knees with the wheel due to the intrusion of the steering gear box.

RELATED ART DOCUMENT

Patent Document (Patent Document 1) Japanese Patent Laid-Open Publication No. 2002-062230 ("Load Testing Method, Feb. 28, 2002)

(Patent Document 2) U.S. Pat. No. 7,415,903 ("Method and System for an Impact Sled Footwell Intrusion System", Aug. 26, 2008)

(Patent Document 3) Korean Patent Laid-Open Publication No. 10-2012-0052845 ("Vehicle Collision Simulation Testing Device")

SUMMARY

An embodiment of the present invention is directed to providing an intrusion simulator capable of reproducing a situation in which a passenger's ankle is broken at the time of intrusion of a structure such as a steering gear box due to a head-on collision of a vehicle and a collision situation of passenger's knees with a wheel or a dash board due to the intruded structure.

In one general aspect, an intrusion simulator includes: a basic board; a moving board formed at a rear upper of the basic board and moving forward and backward; a horizontal board inserted into a rear of the moving board and moving up and down; a dash board having one surface coupled with a hinge part which is formed at a front upper of the moving board and the other surface which moves forward and backward based on the hinge part as a shaft; a steering part formed in front of the other surface of the dash board and including a wheel formed at a rear upper; a moving board actuator formed at one side of the front of the basic board and having one side connected to the moving board to move the moving board forward and backward; a dash board actuator formed at the other side of the front of the basic board and having one side hinge-connected with the dash board to move the dash board forward and backward based on a hinge shaft; and a horizontal board actuator moving the horizontal board up and down.

The steering part may be formed to move up and down.

The intrusion simulator may further include: a steering part actuator moving the steering part up and down.

The moving board actuator and the dash board actuator may be a pneumatic chamber integrated servo actuator including: a body including a piston and a rod; a pneumatic chamber formed at the other side of the body to supply an air pressure; a braking part formed at one side of the body to brake a driving of the rod; and a controller including a servo valve controlling the driving of the rod and the braking part using an oil pressure.

The braking part may include: a control pad contacting the rod to brake the rod; a fixed controller formed at one side of the control pad and supplied with the oil pressure from the controller to fix the control pad; and an operation controller formed at the other side of the control pad and supplied with the oil pressure from the controller, and the operation controller may discharge the oil pressure supplied from the controller to a hydraulic tank to release the rod while being pushed in an opposite direction by a force in a motion direction of the rod.

The horizontal board actuator may include: a horizontal board operating part formed in front and rear directions under the moving board and including a stroke driven horizontal board piston and a horizontal board rod; a sawtooth part formed in front and rear directions while being connected with the horizontal board rod and having a lower portion provided with a sawtooth; a rotating part formed to engage with the sawtooth part and rotating by a stroke driving of the horizontal board operating part; and a vertical moving part formed in a vertical direction while having one surface engaging with the rotating part and moving the horizontal board up and down by a rotation motion of the rotating part while having the other surface connected with the horizontal board.

The horizontal board actuator may be a tandem actuator which includes a lower actuator formed at a lower portion thereof and an upper actuator formed on the lower actuator.

The intrusion simulator may further include: a pneumatic tank supplying an air pressure to the horizontal board actuator and the steering part actuator.

Other features and aspects will be apparent from the following detailed description, the drawings, and the claims.

DETAILED DESCRIPTION OF MAIN ELEMENTS

1000: Intrusion simulator
100: Basic board
110: Sled (slide)
200: Moving board
300: Dash board 310: Hinge part
400: Horizontal board
500: Steering part 510: Wheel
20: Moving board actuator
30: Dash board actuator
40: Horizontal board actuator
41: Horizontal board operating part
41-1: Horizontal board rod
42: Sawtooth part
43: Rotating part
44: Vertical moving part
50: Steering part actuator
60: Pneumatic tank
1: Body
1-1: Piston 1-2: Rod
2: Pneumatic chamber
3: Braking part
3-1: Control pad
3-3: Operation controller
4: Controller

DETAILED DESCRIPTION OF EMBODIMENTS

Hereinafter, an intrusion simulator having features as described above will be described in detail with reference to the accompanying drawings.

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe most appropriately the best method he or she knows for carrying out the invention.

Therefore, configurations described in exemplary embodiments and the accompanying drawings of the present specification do not represent all of the technical spirits of the present disclosure, but are merely most preferable embodiments. Therefore, the present disclosure should be construed as including all the changes, equivalents, and substitutions included in the spirit and scope of the present disclosure at the time of filing this application.

Figure 1:
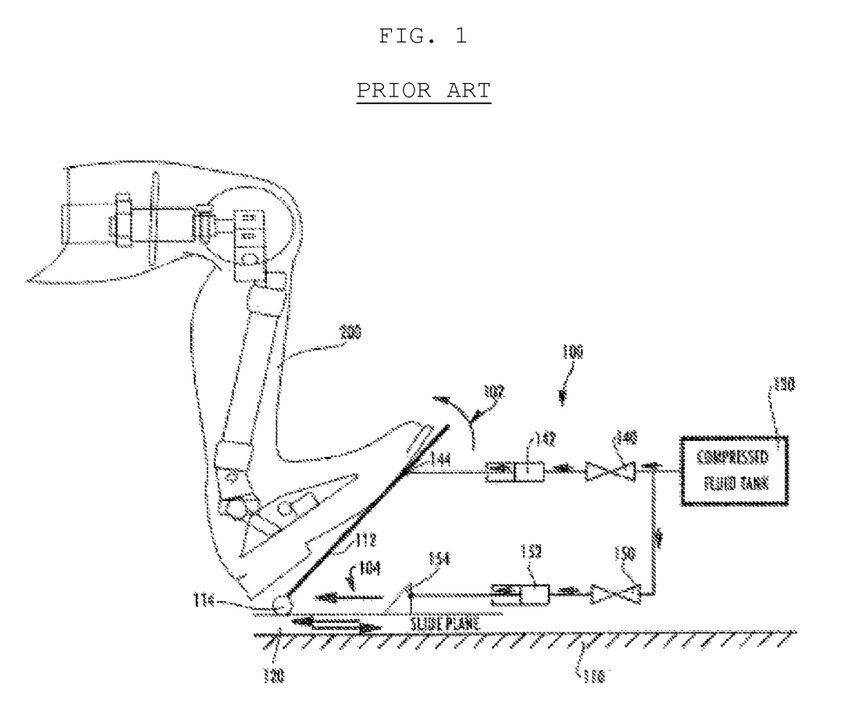
FIG. 1 is a diagram illustrating an intrusion simulator according to the related art.
Figure 3:
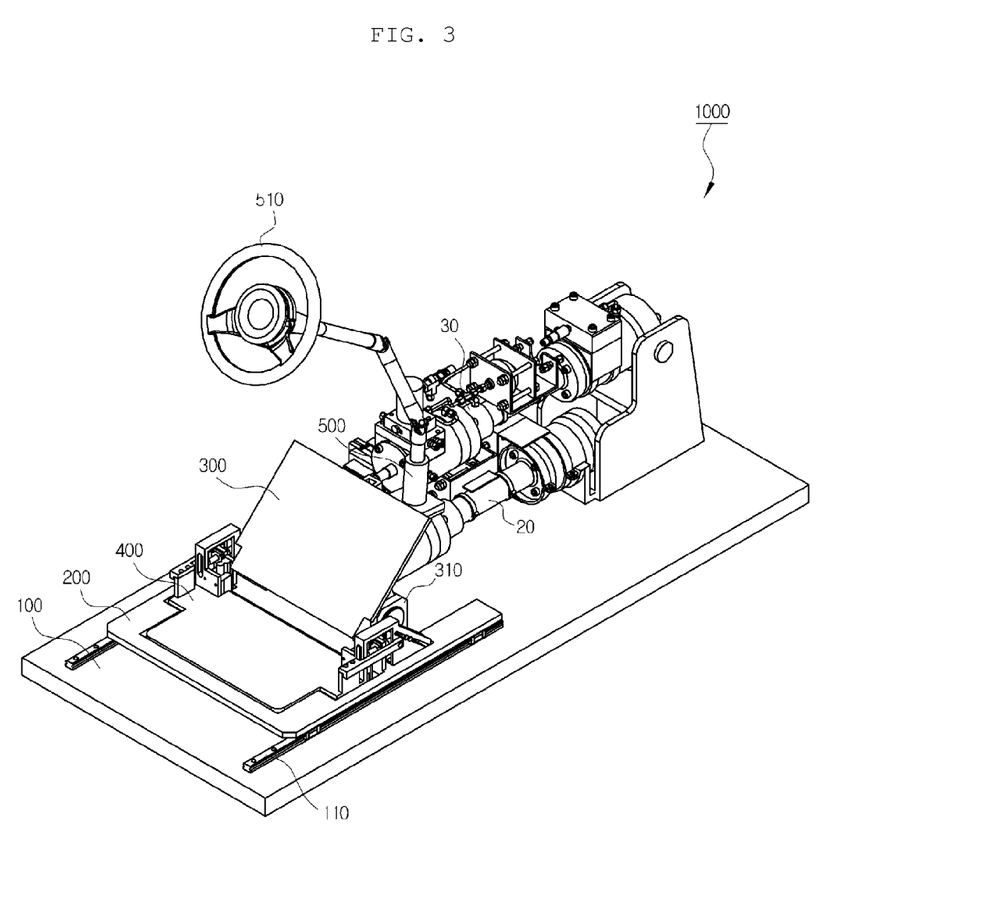
FIG. 3 is a perspective view of an intrusion simulator according to an exemplary embodiment of the present invention.
Figure 4:
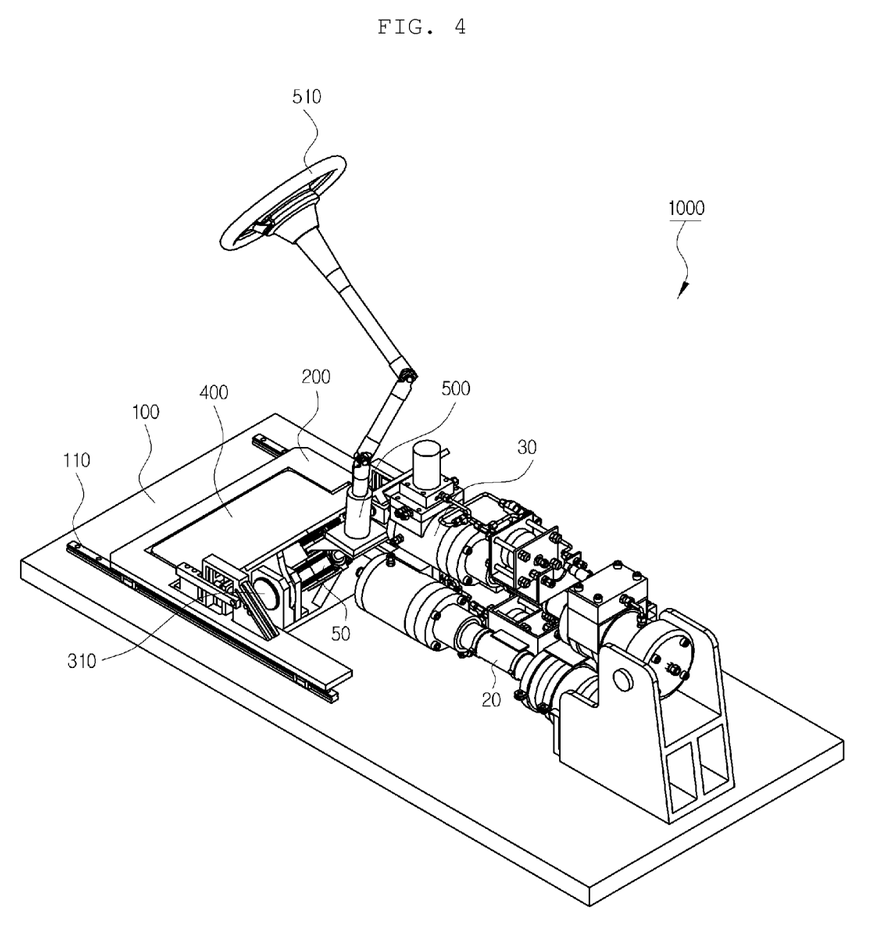
FIG. 4 is a perspective view of an intrusion simulator according to another exemplary embodiment of the present invention.
Figure 5:
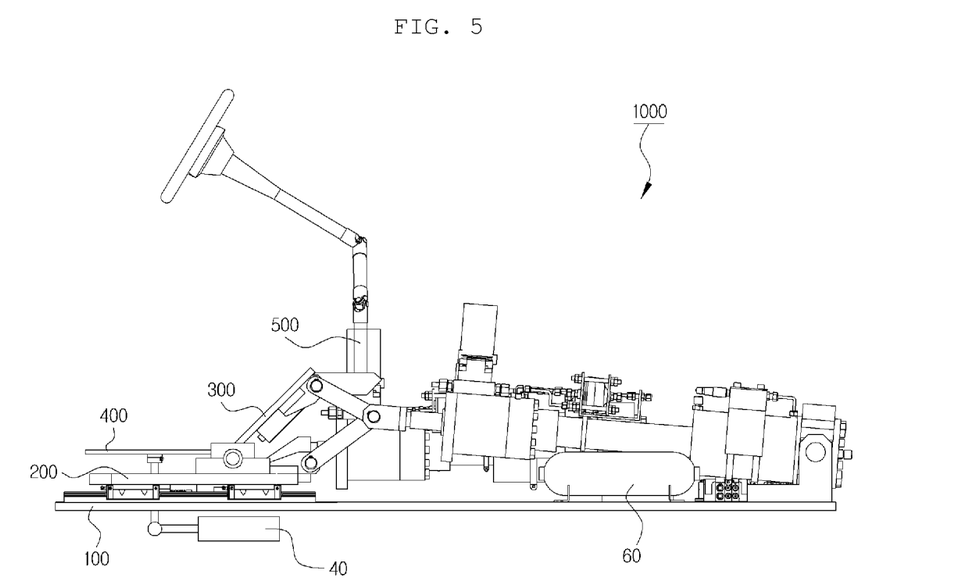
FIG. 5 is a side view of the intrusion simulator according to the exemplary embodiment of the present invention.
Figure 6:
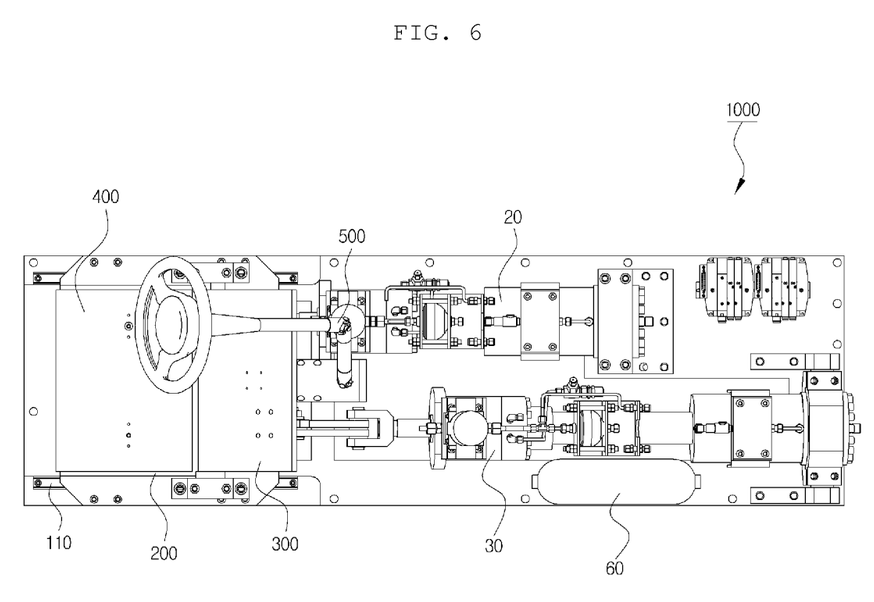
FIG. 6 is a diagram illustrating a formation position of an actuator for an intrusion simulator according to an exemplary embodiment of the present invention.
Figure 7:
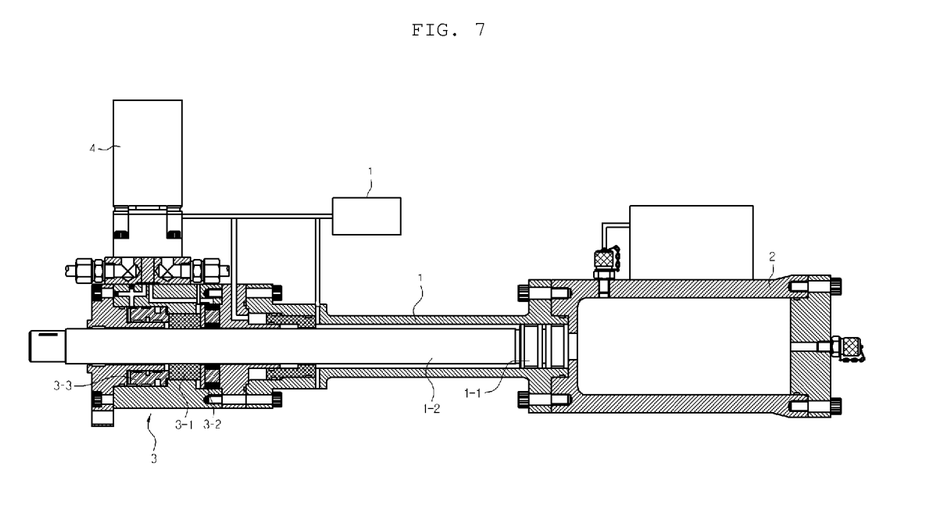
FIG. 7 is a diagram illustrating a moving board actuator and a dash board actuator for an intrusion simulator according to an exemplary embodiment of the present invention.
Figure 8:
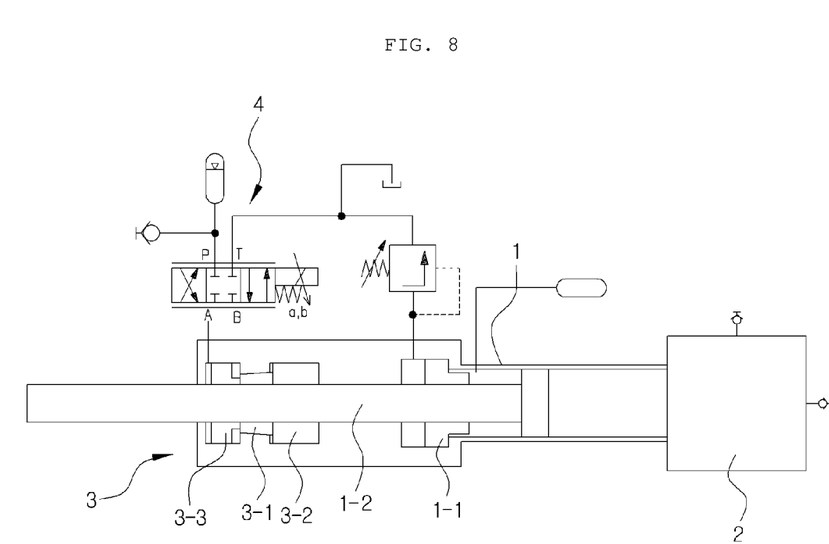
FIG. 8 is a circuit diagram of the moving board actuator and the dash board actuator for the intrusion simulator according to the exemplary embodiment of the present invention.
Figure 9:
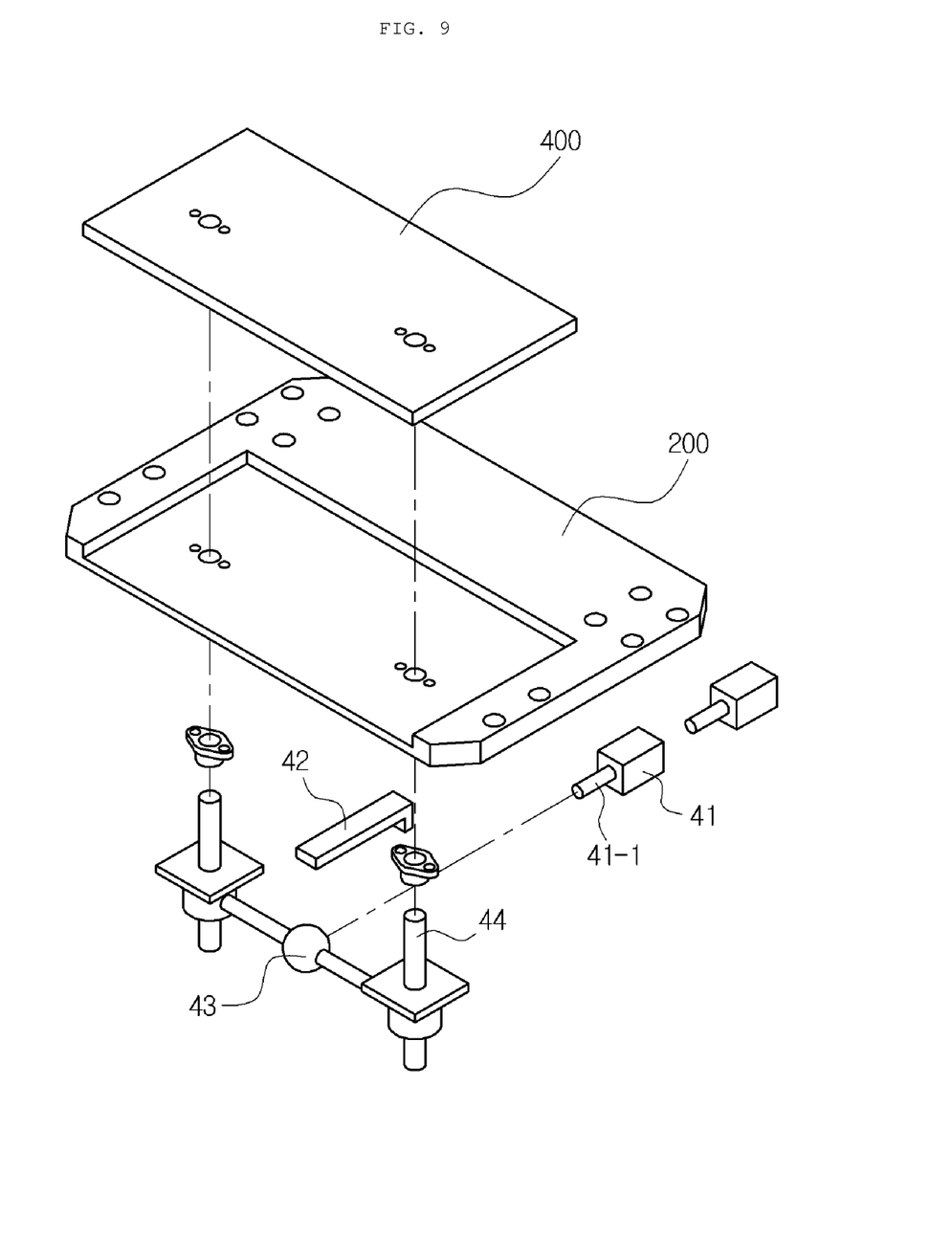
FIG. 9 is a diagram illustrating a horizontal board actuator for the intrusion simulator according to an exemplary embodiment of the present invention.
Figure 10:
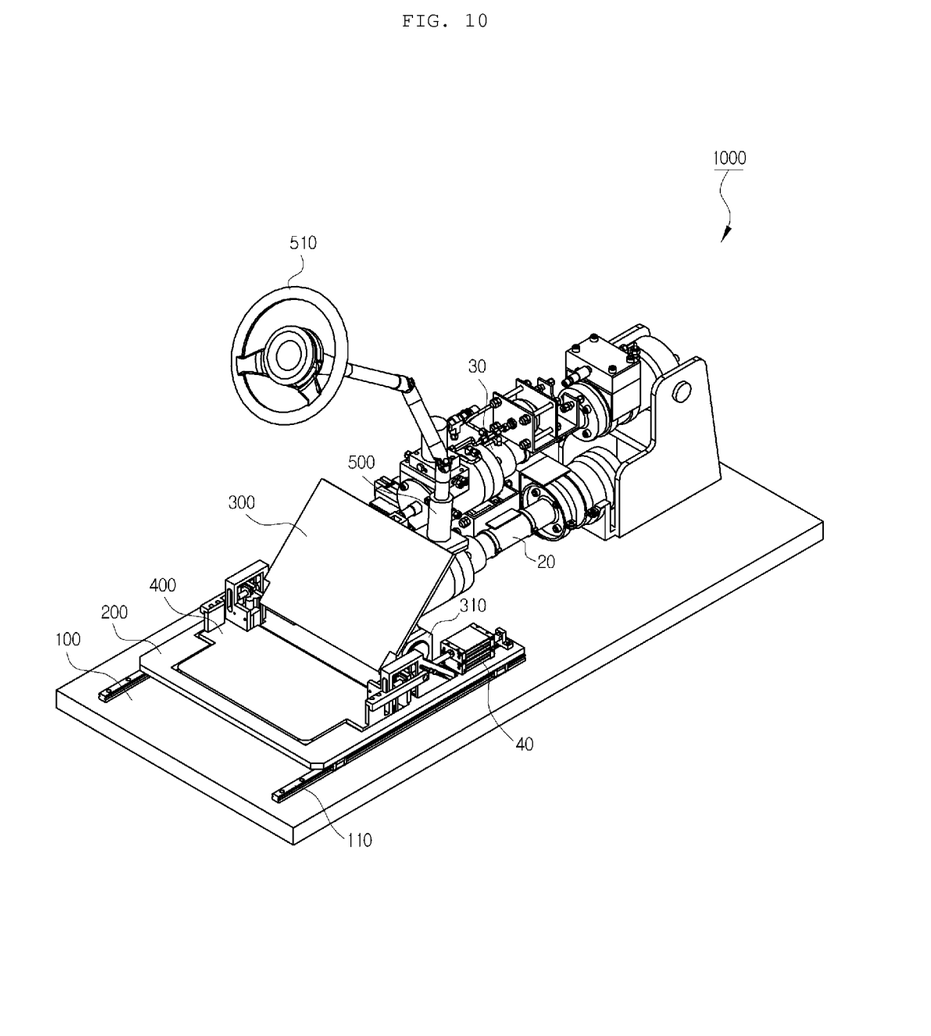
FIG. 10 is a diagram illustrating a horizontal board actuator for the intrusion simulator according to another exemplary embodiment of the present invention.

FIG. 1 is a diagram illustrating an intrusion simulator according to the related art; FIG. 2 is a diagram conceptually illustrating an effect on a driver at the time of a collision of a vehicle; FIG. 3 is a perspective view of an intrusion simulator according to an exemplary embodiment of the present invention; FIG. 4 is a perspective view of an intrusion simulator according to another exemplary embodiment of the present invention; FIG. 5 is a side view of the intrusion simulator according to the exemplary embodiment of the present invention; FIG. 6 is a diagram illustrating a formation position of an actuator for an intrusion simulator according to an exemplary embodiment of the present invention; FIG. 7 is a diagram illustrating a moving board actuator and a dash board actuator for an intrusion simulator according to an exemplary embodiment of the present invention; FIG. 8 is a circuit diagram of the moving board actuator and the dash board actuator for the intrusion simulator according to the exemplary embodiment of the present invention; FIG. 9 is a diagram illustrating a horizontal board actuator for the intrusion simulator according to an exemplary embodiment of the present invention; and FIG. 10 is a diagram illustrating a horizontal board actuator for the intrusion simulator according to another exemplary embodiment of the present invention.

An intrusion simulator 1000 according to an exemplary embodiment of the present invention is a simulator for reproducing an impact on passengers at the time of a head-on collision of a vehicle. In particular, the intrusion simulator 1000 is a simulator which may reproduce a situation in which passengers' ankles are broken due to structures of a vehicle such as a steering gear box and as illustrated in FIG. 2, a collision situation of passengers' knees with a dash board or a wheel of a vehicle due to the intrusion of the structure to reproduce results like an actual collision of vehicles.

As illustrated in FIGS. 3 to 6, the intrusion simulator 1000 according to an exemplary embodiment of the present invention includes a basic board 100 disposed at a lower portion thereof, a moving board 200 affected by an intrusion, a dash board 300, a horizontal board 400, a steering part 500, a moving board actuator 20 applying an accelerating force to the moving board 200, the dash board 300, and the horizontal board 400 to affect them, a dash board actuator 30, and a horizontal board actuator 40.

The moving board 200 is formed at an upper portion of a rear of the basic board 100 while being spaced apart from the basic board 100 at a predetermined distance upward and is formed to be movable forward and backward.

In this case, the moving board 200 may be recommended to be formed above 100 mm from the basic board 100 but may be formed to have variously spaced distance according to a shape and a test environment of a target vehicle for intrusion simulation and therefore the spaced distance of the moving board 200 is not limited thereto.

In this case, the front means a direction in which an actual vehicle moves forward, a direction of a front portion of the vehicle, or a collision direction of the vehicle and the rear means a direction of a rear portion of the actual vehicle.

The moving board 200 is formed over a sled (slide) 110 to move forward and backward. Any apparatus which helps movement of various moving boards 200 may be used as long as it may move the moving board 200 forward and backward.

The rear of the moving board 200 is provided with a horizontal board 400 which is formed to move up and down while being inserted into the moving board 200, in which the horizontal board 400 does not move at a predetermined angle but moves up and down horizontally.

The dash board 300 has one surface coupled with a hinge part 310 which is formed in the upper portion of the front of the moving board 200 and the other surface which may move forward and backward based on the hinge part 310 as a shaft.

In this case, the dash board 300 is recommended to be fixed at about 45° with respect to the moving board 200 in a front (front direction of a vehicle) and has the other surface pushed backward in response to an intrusion by a simulation.

However, an angle of the dash board 300 with respect to the moving board 200 may be diverse depending on a tested vehicle for reproducing collision situations.

The steering part 500 is formed in front of the other surface of the dash board 300 and includes a wheel 510 formed in the rear of the upper portion thereof.

That is, the moving board 200 and the horizontal board 400 reproduce the lower surface of the actual vehicle, the dash board 300 reproduces a situation in which driver's ankles are broken due to the intrusion of a gear box into a lower portion of the dash board at the time of a head-on collision, and the steering part 500 reproduces a collision situation of passengers' knees with the wheel or the lower portion of the dash board due to the intrusion of the gear box.

The moving board actuator 20 which applies an accelerating force to move the moving board 200 forward and backward is formed in front of the basic board 100 and a rod 1-2 is formed to have one side connected to the moving board 200.

The dash board actuator 30 applies the accelerating force to rotate the dash board 300 forward and backward and one side of the dash board actuator 30 including the road 1-2 is hinge-connected with the dash board 300.

That is, the connection of the moving board actuator 20 is not limited to move the moving board 200 forward and backward horizontally, while the dash board actuator 30 needs to move the dash board 300 forward and backward based on the shaft and therefore is recommended to be hinge-connected.

In this case, as the hinge connection, a connection scheme using a rotatable bolt, etc., may be recommended but the exemplary embodiment of the present invention is not limited thereto.

Further, the moving board actuator 20 and the dash board actuator 30 may be vertically formed in parallel with each other as illustrated in FIGS. 3 and 4 and may be horizontally formed in parallel with each other as illustrated in FIG. 5.

This may be variously formed according to a test space in which a test will be performed and a test purpose and therefore the formation positions of the moving board actuator 20 and the dash board actuator 30 illustrated in FIGS. 3 and 5 are not limited and therefore various formation positions may be possible.

Further, as illustrated in FIGS. 7 and 8, the moving board actuator 20 and the dash board actuator 30 are a pneumatic chamber integrated servo actuator which includes a body 1 including a stroke driven piston 1-1 and the rod 1-2, a pneumatic chamber 2 formed at the other side of the body 1 to supply an air pressure, a braking part 3 formed at one side of the body 1 to brake the driving of the rod 1-2 which protrudes outward, and a controller 4 including a servo valve which controls the driving of the rod 1-2 and the braking part 3 using an oil pressure.

Describing in more detail the pneumatic chamber integrated servo actuator, when an actuator for an intrusion simulator according to the related art is stroke-driven to apply the accelerating force, the accelerating force is delivered to the moving board and the braking is controlled by an impact board formed on the rear surface of the moving board, and as a result, when the impact is not completely absorbed, the measured results depending on the impact are likely to be changed.

On the other hand, the pneumatic chamber integrated servo actuator used as the moving board actuator 20 and the dash board actuator 30 according to the exemplary embodiment of the present invention is based on a scheme of contacting a wedge-shaped control pad 3-1 with the rod 1-2 to brake the rod 1-2, like a brake scheme.

That is, the scheme drives the actuator by fixing a fixed controller 3-2 formed at one side of the control pad 3-1 while contacting the rod 1-2 by an oil pressure so as to brake the rod 1-2, allowing an operation controller 3-3 formed at the other side of the control pad 3-1 to discharge the oil pressure supplied from the fixed controller 3-2 to a hydraulic tank, and releasing the rod 1-2 while being pushed in an opposite direction for controlling by a force in the moving direction of the rod 1-2.

The scheme may reproduce collision results like the actual collision of vehicles and more accurately and easily brake the rod than the hydraulic actuator performing the braking based on the oil pressure or the air pressure, thereby applying the accelerating force at a faster speed.

Further, the moving board actuator 20 and the dash board actuator 30 are integrated with a pneumatic chamber 2 which may apply an air pressure of a maximum of 350 bar or more to the other side, thereby saving the installation space of the intrusion simulator.

Further, the controller 4 including a servo valve automatically controls the accelerating force of the moving board actuator 20 and the dash board actuator 30 using the servo valve, thereby accurately reproducing the measured results in the intrusion test simulation.

However, the moving board actuator 20 and the dash board actuator 30 of the intrusion simulator 1000 according to the exemplary embodiment of the present invention are not limited to the pneumatic chamber integrated servo actuator and therefore a kind of the moving board actuator 20 and the dash board actuator 30 is not limited as long as they may satisfactorily reproduce the simulation using the intrusion simulator.

As illustrated in FIG. 9, the intrusion simulator 1000 according to the exemplary embodiment of the present invention includes a horizontal board actuator 40 which is formed under the moving board 200 and applies the accelerating force to move the horizontal board 400 up and down.

The horizontal board actuator 40 includes horizontal board operating part 41 which is formed in front and rear directions and includes a stroke driven horizontal board piston and horizontal board rod 41-1, a sawtooth part 42 which is formed in front and rear directions while being connected to the horizontal board rod 41-1 and has a sawtooth formed thereunder, a rotating part 43 which is formed to engage with the sawtooth of the sawtooth part 42 and rotates by the stroke driving of the horizontal board operating part 41, and a vertical moving part which is formed in a vertical direction while having one surface engaging with the rotating part 43 and moves up and down by the rotation of the rotating part 43 while having the other surface connected with the horizontal board 400 to move the horizontal board 400 up and down.

In this case, the vertical moving part 44 may move up and down by engagement of a saw-toothed wheel depending on the rotation of the rotating part 43, the air pressure depending on the rotation of the rotating part 43, and so on and the sawtooth part 42 may also be variously operated by the rotating motion of the rotating part 43 by the engagement of the saw-toothed wheel or the rotation of the rotating part by the air pressure, and so on.

Further, the horizontal board operating part 41 may be formed as a thin type cylinder and may be formed by connecting at least two thin type cylinders in series to control the stroke.

However, a kind and a connection scheme of the cylinder of the above-mentioned horizontal board operating part 41 are not limited but may be various.

Further, as illustrated in FIG. 10, the horizontal board actuator 41 of the intrusion simulator 1000 according to the exemplary embodiment of the present invention is stroke-driven like an air cylinder type and may be formed as a tandem actuator which is provided in pair.

As illustrated in FIGS. 3 to 6, the intrusion simulator 1000 according to the exemplary embodiment of the present invention may be formed to move the steering part 500 up and down to reproduce various situations about the vehicle collisions.

In this case, to move the steering part 500 up and down, the intrusion simulator according to the exemplary embodiment of the present invention may further include a steering part actuator 50 which is formed under the steering part 500 to move the steering part 500 up and down.

A kind of the actuator is not limited as long as the steering part actuator 50 may accurately move the steering part 500 up and down.

Further, the steering part actuator 50 is recommended to have one surface connected to the lower portion of the steering part 500 to move the steering part 500 up and down and the other surface connected to the moving board 200 but is not limited thereto and therefore may be formed at various positions.

In other words, the intrusion simulator 1000 according to the exemplary embodiment of the present invention is formed to reproduce the collision situations of the vehicle, in which the moving board 200 is formed to reproduce a floor of a vehicle moving backward at the time of the collision of the vehicle, the dash board 300 is formed to reproduce the breaking phenomenon of passengers' ankles due to the dash board at the time of the collision, the horizontal board 400 and the steering part 500 are formed to reproduce the collision situation of passenger's knees with the wheel or the dash board due to the intruded structure by the collision of the vehicle, the steering part 500 is formed to move up and down so as to reproduce various intrusion situations, thereby accurately reproducing the results generated at the time of the actual head-on collision of vehicles.

Further, the intrusion simulator 1000 according to the exemplary embodiment of the present invention may further include a pneumatic tank 60 which supplies the air pressure to the horizontal board actuator 40 and the steering part actuator 50.

Since the horizontal board actuator 40 and the steering part actuator 50 supply an air pressure of a maximum of 5 bar as compared with the moving board actuator 20 and the dash board actuator 30 supplying an air pressure of a maximum of 350 bar, it is more preferable to separately include the pneumatic tank 60 supplying the air pressure in consideration of the space of the simulator than the pneumatic tank 60 which is integrally formed.

However, the separate formation of the pneumatic tank is a recommendation. As a result, the horizontal board actuator 40 and the steering part actuator 50 may also be formed as the actuator in which the pneumatic chamber is integrated and therefore the exemplary embodiment of the present invention is not limited to the pneumatic tank supplying the air pressure to the moving board actuator 20 and the dash board actuator 30.

According to the exemplary embodiments of the present invention, it is possible to reproduce the situation in which the passenger's ankle is broken at the time of the intrusion of the structure such as the steering gear box due to the head-on collision of the vehicle and the collision situation of the passenger's knees with the wheel or the dash board due to the intruded structure.

In particular, the intrusion simulator according to the exemplary embodiments of the present invention may apply the accelerating force using the automatically controllable servo actuator to reproduce each situation to perform the simulation, thereby obtaining the accurately measured values.

Further, the intrusion simulator according to the exemplary embodiment of the present invention may be installed together with the yawing test simulator of the vehicle to reproduce the results like the actual collision phenomenon of vehicles.

Further, the intrusion simulator according to the exemplary embodiment of the present invention may reproduce the results like the actual collision phenomenon of vehicles to improve the structure of the vehicle body in the development or production of the vehicle.

What is claimed is:

1. An intrusion simulator, comprising:
   a basic board;
   a moving board formed at a rear upper portion of the basic board and moving forward and backward;
   a horizontal board inserted into a rear of the moving board and configured to move up and down;
   a dash board having one surface coupled with a hinge part which is formed at a front upper portion of the moving board and the other surface which moves forward and backward based on the hinge part as a shaft;
   a steering part formed in front of the other surface of the dash board and including a wheel formed at a rear upper portion;
   a moving board actuator formed at one side of the front of the basic board and having one side connected to the moving board to move the moving board forward and backward;
   a dash board actuator formed in the other side of the front of the basic board and having one side hinge-connected with the dash board to move the dash board forward and backward based on a hinge shaft; and
   a horizontal board actuator moving the horizontal board up and down,
   wherein the horizontal board actuator comprises:
   a horizontal board operating part formed in front and rear directions under the moving board and including a stroke driven horizontal board piston and a horizontal board rod;
   a sawtooth part formed in front and rear directions while being connected with the horizontal board rod and having a lower portion provided with a sawtooth;
   a rotating part formed to engage with the sawtooth part and rotating by a stroke driving of the horizontal board operating part; and
   a vertical moving part formed in a vertical direction while having one surface engaging with the rotating part and moving the horizontal board up and down by a rotation motion of the rotating part while having the other surface connected with the horizontal board.

2. The intrusion simulator of claim 1, wherein the steering part is formed to move up and down.

3. The intrusion simulator of claim 2, further comprising:
   a steering part actuator moving the steering part up and down.

4. The intrusion simulator of claim 1, wherein the moving board actuator and the dash board actuator are a pneumatic chamber integrated servo actuator including:
   a body including a piston and a rod;
   a pneumatic chamber formed in the other side of the body to supply an air pressure;
   a braking part formed at one side of the body to brake a driving of the rod; and
   a controller including a servo valve controlling the driving of the rod and the braking part using an oil pressure.

5. The intrusion simulator of claim 4, wherein the braking part includes:
   a control pad contacting the rod to brake the rod;
   a fixed controller formed at one side of the control pad and supplied with the oil pressure from the controller to fix the control pad; and
   an operation controller formed at the other side of the control pad and supplied with the oil pressure from the controller, and
   the operation controller discharges the oil pressure supplied from the controller to a hydraulic tank to release the rod while being pushed in an opposite direction to a control by a force in a motion direction of the rod.

6. The intrusion simulator of claim 1, wherein the horizontal board actuator is a tandem actuator which includes a lower actuator formed at a lower portion thereof and an upper actuator formed on the lower actuator.

7. The intrusion simulator of claim 1, further comprising:
   a pneumatic tank supplying an air pressure to the horizontal board actuator and the steering part actuator.

8. An intrusion simulator, comprising:
   a basic board;
   a moving board formed at a rear upper portion of the basic board and moving forward and backward;
   a horizontal board inserted into a rear of the moving board and configured to move up and down;
   a dash board having one surface coupled with a hinge part which is formed at a front upper portion of the moving board and the other surface which moves forward and backward based on the hinge part as a shaft;
   a steering part formed in front of the other surface of the dash board and including a wheel formed at a rear upper portion;
   a moving board actuator formed at one side of the front of the basic board and having one side connected to the moving board to move the moving board forward and backward;
   a dash board actuator formed in the other side of the front of the basic board and having one side hinge-connected with the dash board to move the dash board forward and backward based on a hinge shaft; and
   a horizontal board actuator moving the horizontal board up and down,
   wherein the horizontal board actuator comprises:
   a horizontal board operating part formed in front and rear directions under the moving board;
   a rotating part rotating by a stroke driving of the horizontal board operating part; and
   a vertical moving part formed in a vertical direction moving the horizontal board up and down by a rotation motion of the rotating part.

* * * * *